(No Model.) 5 Sheets—Sheet 1.
E. R. PUFFER.
RECORDING WEIGHING SCALE.
No. 323,885. Patented Aug. 4, 1885.
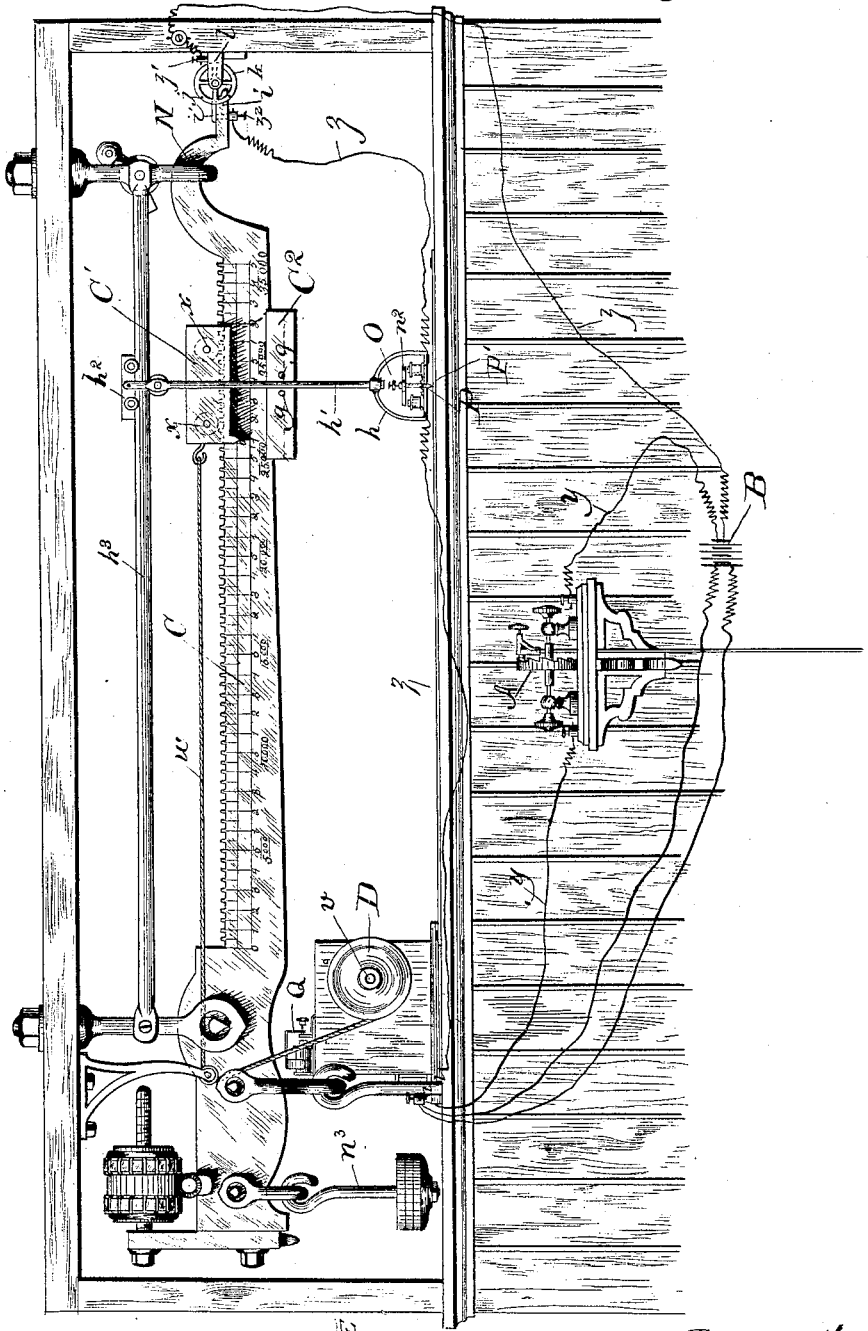
Witnesses:
Chas. E. Gaylord.
Douglas Dyrenforth.
Inventor:
Edwin R. Puffer
by Dyrenforth & Dyrenforth
Attys.

(No Model.)  E. R. PUFFER.  5 Sheets—Sheet 2.
RECORDING WEIGHING SCALE.
No. 323,885.  Patented Aug. 4, 1885.
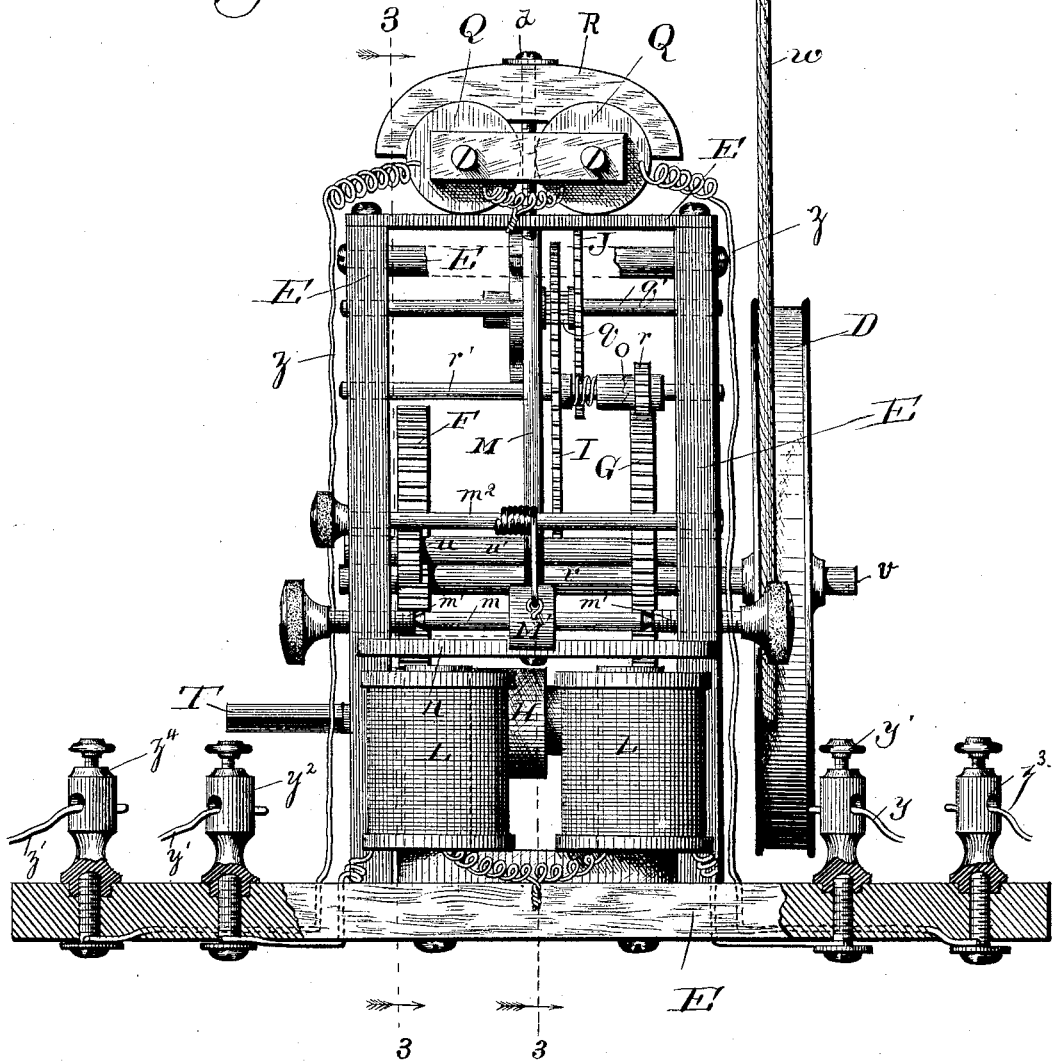

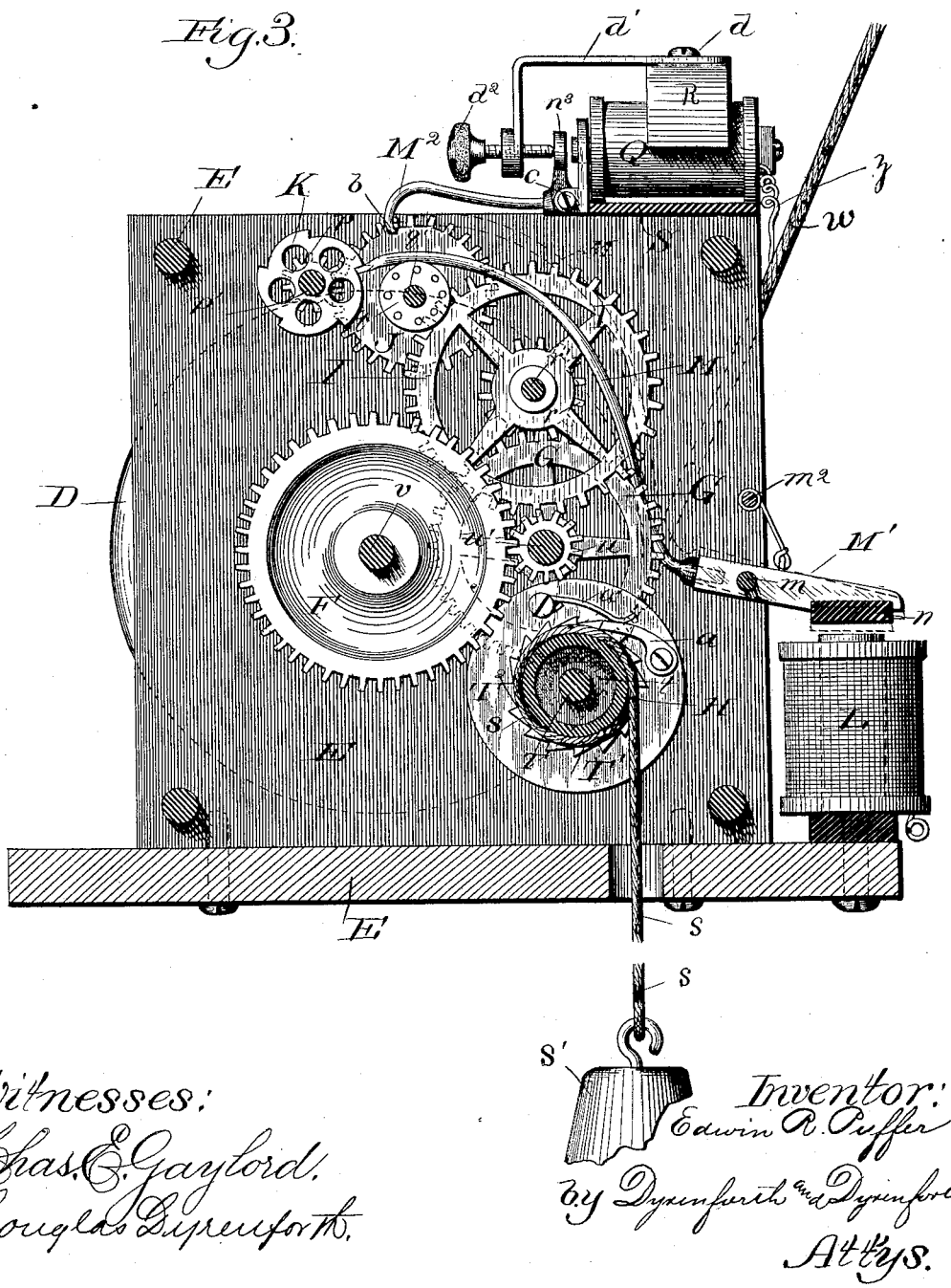

(No Model.) 5 Sheets—Sheet 4.
E. R. PUFFER.
RECORDING WEIGHING SCALE.
No. 323,885. Patented Aug. 4, 1885.
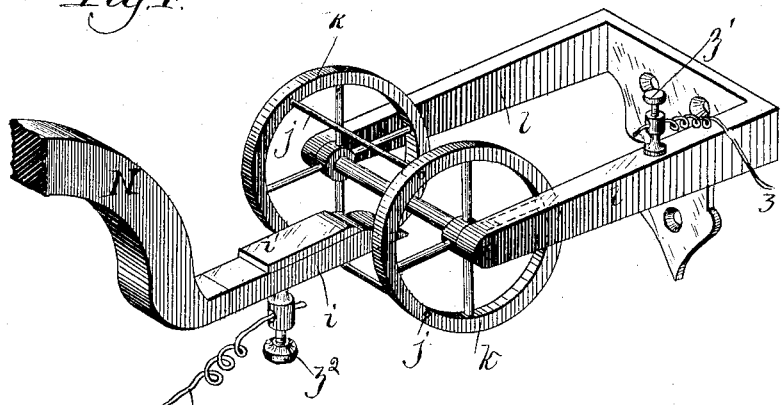
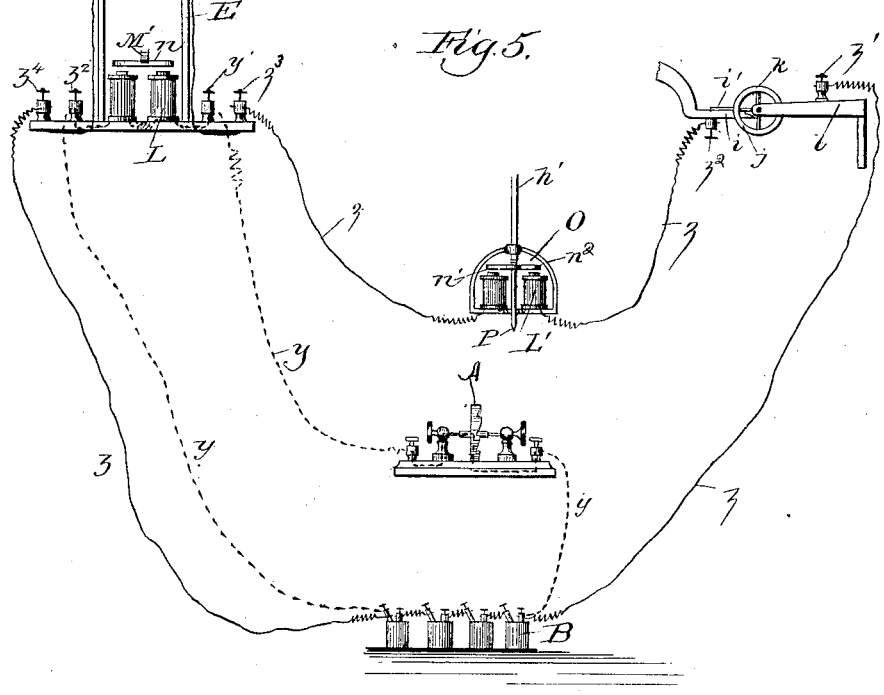
Witnesses:
Chas. E. Gaylord.
Douglas Dyrenforth
Inventor.
Edwin R. Puffer,
by Dyrenforth and Dyrenforth
Att'ys.

(No Model.) 5 Sheets—Sheet 5.
E. R. PUFFER.
RECORDING WEIGHING SCALE.
No. 323,885. Patented Aug. 4, 1885.
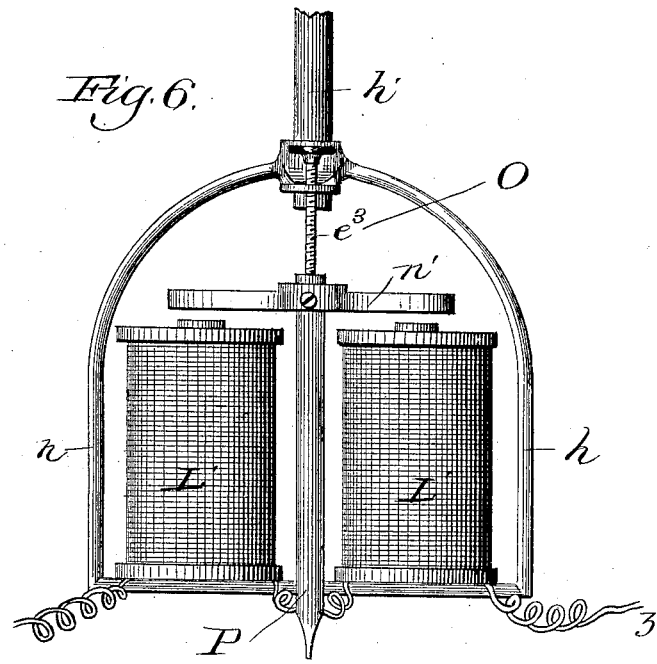
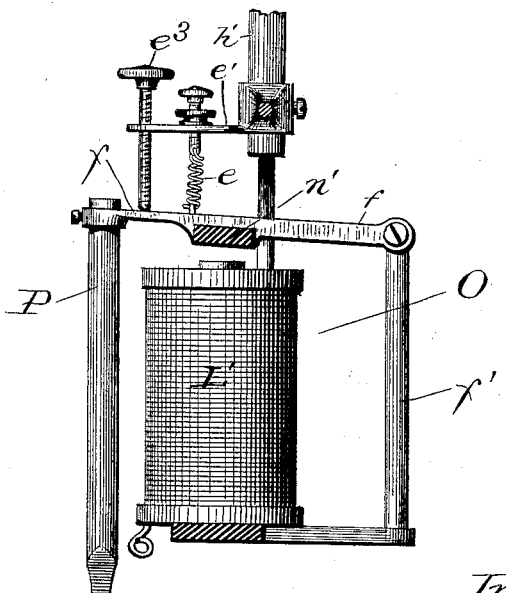
Witnesses:
Chas. E. Gaylord
Douglas Dyrenforth
Inventor:
Edwin R. Puffer
by Dyrenforth and Dyrenforth
Attys.

UNITED STATES PATENT OFFICE.

EDWIN R. PUFFER, OF RIVERSIDE, ILLINOIS.

RECORDING WEIGHING-SCALE.

SPECIFICATION forming part of Letters Patent No. 323,885, dated August 4, 1885.

Application filed February 11, 1884. (No model.)

*To all whom it may concern:*

Be it known that I, EDWIN R. PUFFER, a citizen of the United States, residing at Riverside, in the county of Cook and State of Illinois, have invented certain new and useful Improvements in Scales; and I hereby declare the following to be a full, clear, and exact description of the same.

My present invention is in the nature of an improvement upon the inventions in scales for which I have filed applications for Letters Patent of the United States, one of which, filed July 5, 1883, Serial No. 100,102, was allowed October 16, 1883, and the other of which, Serial No. 109,572, was filed October 20, 1883. In these inventions an auxiliary scale mechanism is employed in connection with the scale proper for the purpose of accomplishing the results attained by their use. In my present invention means are provided to actuate the poise upon the scale-beam of an ordinary platform-scale, to cause to be registered automatically and automatically recorded upon a paper strip having numbers marked upon it to indicate weights corresponding with those marked upon the scale-beam the pressure exerted upon the platform.

The adjustment of claims for rebate of charges for freight, the claims arising from inaccuracies in the weighing of cars, constitutes one of the most troublesome of a freight agent's duties. The employé upon whom devolves the duty of weighing the cars of moving trains must necessarily be satisfied with guessing at the weights, since even the very slow speed to which the moving trains are subjected while passing over the scale-platform does not afford him the time requisite to adjust the poise for one car and readjust it for the succeeding and for each following car. A weigher's conjecture in regard to the weight of a car is found ordinarily to vary, at a low estimate, from one thousand to fifteen hundred pounds from its actual weight, entailing upon the company a loss of the difference in charge between the estimated and the correct weight when the former is below the actual weight, and when above the same making them liable to the extent of the representation of the shipper, who may be mistaken.

It is my object to overcome the difficulties above enumerated by causing the weight of each car of a moving train, or the weight of any other moving body, to be automatically registered and automatically recorded upon a paper strip suitably provided with numbers; and to this end my invention consists in mechanism applied to the poise to cause it, the instant a moving body shall have reached a predetermined point upon the platform, to move automatically upon the scale-beam until equilibrium is established, mechanism for causing the poise to come to rest when equilibrium of the scale-beam shall have been attained, and mechanism operating the instant the poise shall reach the point of equilibrium upon the scale-beam to record the weight of the object moving upon the platform; and my invention further consists in the particular mechanisms which I prefer to employ for the above purposes.

I prefer to employ electricity as the medium for producing the operation of my device, though different mechanisms could be devised to take the place of electricity. In the following description I have confined myself to the application of the last-named medium for effecting the desired results.

In the drawings, Figure 1 is a side elevation of the upright portion of a platform-scale provided with my improvements; Fig. 2, an end elevation of the mechanism for operating the poise; Fig. 3, a section of the same, taken on the line 3 3 of Fig. 2, showing the gear in elevation; Fig. 4, a perspective view of the mechanism operating to close and open the electric circuit, by means of which the recording mechanism is actuated and the poise brought to rest; Fig. 5, a side elevation of portions of my device, showing the connecting-points of the wires to form the electric circuits, the arrangement being the same as that less clearly shown in Fig. 1; Fig. 6, a front elevation of my recording mechanism, and Fig. 7, a vertical section of the device shown in Fig. 6, taken at one side of the center, and presenting a side view of the mechanism controlling the marker.

My present device, like those referred to as being now before the office, is intended, as hereinbefore mentioned, for use principally in weighing the cars of moving trains, and to operate it I employ part of the mechanism shown and described in the latter of the said applications—viz., the compound lever, located under the platform, and having a vertical pin near one end projecting at the desired point through a rail of the track upon the platform; the wheel provided with lateral shoulders and with pins upon its periphery to close the circuit momentarily by the contact of a pin with a spring situated toward the under side of the wheel somewhat in the rear of the lowest attainable point of the pins; and the mechanism attached near the opposite end of the compound lever, and actuated by the latter, to revolve the wheel a prescribed distance, for the purpose specified in the description forming part of the said application. The analogy between the operations of the two devices ceases with the spring where the circuit is closed.

When the fourth wheel of the car, by its action upon the compound lever, and through the medium of the mechanism between the lever and the wheel A, Figs. 1 and 5 of the present drawings, shall have caused the pin upon the same to close the circuit for the current generated in the battery B, same figures, the poise C′ will be actuated to move upon the scale-beam C, to establish equilibrium of the latter.

A description of the mechanism by means of which this feature of my purpose is accomplished is as follows: To one end of the poise C′, the normal position of which is toward the vibratory end of the scale-beam, and which is provided with rollers $x$, to reduce to the minimum the friction of the latter in its movement upon the scale-beam, a cord, $w$, is suitably attached. The opposite end of the cord passes in a backward direction to and is secured upon a drum, D. The drum D and other mechanism co-operating with it are supported by frame-work E. Upon the shaft $v$ of the drum D is the spur-wheel F, which meshes with a pinion, $u$, on the shaft $u'$. G is a spur-wheel upon the shaft $u'$, meshing with a pinion, $t$, on the barrel H, to which one end of a cord, $s$, having a weight, $s'$, attached to its opposite end, is secured. The wheel G also meshes with the pinion $r$ of the wheel I upon the shaft $r'$, and the wheel I with the pinion $q$ of the wheel J on the shaft $q'$. The wheel J meshes with the pinion $p$, Fig. 3, of the ratchet-wheel K on the shaft $p'$. The purpose of the mechanism just described is to draw the poise C′ backward from the vibratory end of the scale-beam upon the latter by means of the cord $w$, through the medium of the gravity of the weight $s'$, Fig. 3, which, in descending, revolves the drum H in one direction and the drum D, through the action of the intervening mechanism, in the opposite direction, to wind the cord $w$ upon its periphery. Of the wheels, F and G are the only ones necessary to actuate the poise, the wheels I, J, and K serving merely as governors to prevent too rapid motion of the former. The pinion $r$ is not secured to the shaft $r'$ to revolve with the latter when the poise is brought back by hand, after having indicated the weight of one moving car, to enable it to perform the same service for another, since that operation is required to be done rapidly, thus rendering the governing-wheels unnecessary; but a clutch, $o$, is provided to permit the pinion $r$ to turn independently of the axle $r'$ when the cord $w$ is being unwound from the drum D.

With the closing of the circuit emanating from the battery B, Figs. 1 and 5, the current traverses the conductor $y$ to the binding-post $y'$, magnetizes the electro-magnet L to attract the armature $n$, whereby the finger or pawl M, the base M′ of which is secured toward one end upon the armature and toward the opposite end to a shaft, $m$, which has a pivotal movement within its bearings $m'$, is withdrawn from its engagement with the ratchet-wheel K and caused to engage with the hook or finger M², where it is held at its point by the notch $b$, formed toward the end of the hook or finger M², to prevent it from falling of its own accord, and re-engaging with the wheel K as soon as the circuit is opened by the clearing of the circuit-closing spring by a pin on the wheel A. The current passes back to the battery by way of the binding-post $y^2$, Fig. 5. A rod, $m^2$, having its bearings within the sides of the frame-work E, has a spring coiled upon it, being attached at one end to the finger M at its base M′, which is secured to the armature, to serve the purpose of raising the latter from the electro-magnet as soon as the circuit shall have been opened and the point of the finger M shall have been released by the finger M², in the manner hereinafter particularly described.

When released, as just described, the finger M will occupy and be upheld in the position indicated by the dotted lines in Fig. 3, thus permitting the drum H to be revolved in one direction by the gravity of the weight $s'$, whereby the drum D will be turned in the opposite direction to wind the cord $w$ upon its periphery, and thereby draw the poise C′ along the scale beam C. The poise C′ will be caused to come to rest as soon as equilibrium is established—or, in other words, as soon as the weight of the car upon the platform is indicated by it upon the scale-beam—through the operation of the mechanism of which the following is a description.

A second conductor, $z$, Figs. 1 and 5, leads from the battery to the binding-post $z'$ upon a horizontal frame, $l$, secured to one of the uprights of the frame-work of the platform-scale. The frame $l$ is composed of conducting material, and supports, toward one end, the wheels $k$, also of conducting material, and having connecting-rods $j$, forming conductors, and extending transversely between the wheels, the opposite ends being secured within the fellies.

A piece of gutta-percha or other non-conducting material, $i$, is attached horizontally at one end to the end of the scale-beam head N, the attachment $i$ being suitably beveled toward its opposite end, as clearly shown in Fig. 4 of the drawings. A plate, $i'$, of conducting material, is fastened upon the upper side of the part $i$ in a manner to leave a narrow space upon the non-conducting portion between the end of the plate $i'$ and the upper edge of the bevel, and a binding-screw, $z^2$, is caused to have contact with the under side of the plate $i'$ by being inserted through the part $i$ from its lower side. (See Fig. 1.) The normal position of the attachment just described is between the rods $j$, which are so arranged that the instant the poise shall have reached the point upon the beam at which equilibrium of the same is effected the part $i$ will be caused to rise and produce contact of the end of the conducting-plate $i'$ and the upper rod $j$, whereby the circuit will be closed. The circuit remains closed for an instant only, for the reason that the poise, owing to its momentum, and to the momentarily continued action of the drum mechanism after the point of equilibrium has been reached, will continue in its movement upon the beam somewhat back of the point of equilibrium, thereby causing the end of the beam to rise, extending the arc of the circle described by it, and thus bringing the upper rod $j$ into contact with the non-conducting end of the part $i$, whereby the circuit will be opened. The lower rod $j$ affords a means for restoring the wheels to their normal position when the poise is drawn back by hand, as hereinafter particularly stated, to make ready for the next car.

The current passes from the binding-screw $z^2$ at the instant of closing the circuit by means of the continuation of the conductor $z$ to the recording mechanism O, (see Figs. 6 and 7,) having a frame, $h$, suspended by a vertical rod, $h'$, from a guide, $h^2$, provided with rollers upon a bar, $h^3$, suitably supported at its ends, as shown in Fig. 1 of the drawings, the vertical rod $h'$ being confined between guide-pins $g$ upon the side of the guide $C^2$ of the poise $C'$, to cause the recording mechanism to move with the poise. A marker, P, also forms part of the recording device, and is secured to one end of the bar $f$, which is pivoted at its opposite end to an upright, $f'$, and which carries an armature, $n'$, withheld from contact with the electro-magnet L' by means of the adjustable spring $e$ upon the frame $e'$, which is supported upon the vertical rod $h'$, and adjusted by the set-screw $e^3$.

As the current passing from the binding-screw $z^2$ to the electro-magnet L' magnetizes the latter, the armature is attracted by it, and causes the marker to record upon a strip of paper provided with numbers to coincide with those upon the scale-beam, and located below the latter upon the frame of the scale, the weight of the car upon the platform, the fourth wheel of which will have caused the momentary closing of the circuit, thereby raising the pawl or finger M, thus causing the weight $s'$ to revolve the drum H which in turn causes the drum D to revolve in the opposite direction, winding the cord $w$ around it, and drawing the poise C' to a point upon the scale-beam where equilibrium of the latter is established, when the rise of the end N of the beam effects the momentary closing of the other circuit, which actuates the marker to record upon the strip of paper referred to the weight of the car upon the platform. Were the operation to end here, and were no provision made to stop the motion of the wheels produced by the descent of the weight $s'$ upon the drum H, the poise would be moved upon the beam until hindered in its progress by the first impediment in its way. To obviate this, mechanism, of which the following is a description, is provided:

Q is a horizontal electro-magnet, magnetized by the current which traverses the conductor $z$, continued from the binding-screw $z^2$ to the binding-screw $z^3$, thence entering the magnet, and, like the current traversing the circuit $y$, passing back to the battery by way of a binding-screw, $z^4$. A frame, R, rests upon the magnet Q, being secured in position by a screw, $d$, which at the same time sustains the right-angular strip $d'$, Fig. 3, provided to afford a position for the adjusting-screws $d^2$ for the armature $n^3$. This armature is supported and moves upon the pivotal screw $c$, inserted into a portion of the frame S, which pivot also sustains the finger $M^2$.

When the armature is attracted by the electro-magnet Q, the hooked end of the finger $M^2$ rises, thereby releasing the point of the finger M (which occupies the position shown by the dotted lines in Fig. 3 of the drawings) from the notch $b$, formed on the finger $M^2$, allowing the finger M to drop to the position shown by the full lines, the point engaging with the ratchet-wheel K, and thus stopping the machinery.

The distance from the rear wheels of one car in a train to the front wheels of the next following car being generally about six feet, sufficient time intervenes after the weighing of one car in a train before the fourth wheel of the next reaches the pin protruding through a rail to permit the poise to be drawn back by hand to the position from which it is started. By this operation the cord $w$ is unwound from the drum D, and the cord $s$ wound upon the drum H, when the device is ready to register and record the weight of the next succeeding car.

An arbor, T, Fig. 2, projects from the drum H to permit the cord $s'$ to be wound upon the said drum initiatory to preparing the device for the first operation of weighing. As this winding must occur without affecting the gear mechanism actuating the drum D and poise, the ratchet-wheel T' is provided upon the drum H, and a dog, $a$, and spring $a'$ upon the annular plate $T^2$, surrounding the said drum. A more detailed description of the mechanism last referred to is not deemed necessary, since it is not new for similar purposes, and therefore no claim is made to it.

Instead of moving the poise upon the scale-beam by means of a cord, it is found to be quite practicable to effect the movement of the poise by introducing the necessary mechanism into it, and this construction is intended to be covered by my present application.

In the foregoing description my device is limited to the purpose of automatically registering and recording the weight of each car of a moving train, and the mechanism described is intended only for this purpose. My invention, however, is much more comprehensive than this, since it consists, broadly stated, in causing the weight of a body moving across the platform of a scale to be automatically registered by the poise, and at the same time automatically recorded. Changes in the mechanism may be provided to render the device capable of weighing objects sliding upon the platform.

It will be seen from the foregoing description that the normal location of the poise upon the scale-beam is near the vibratory end of the latter, whereby it is in a position to balance a weight that would tax the full capacity of the scale. Though this is indicated in Fig. 1 of the drawings to be thirty-five thousand pounds, it could of course be either greater or smaller—for weighing cars, much greater—and the capacity of the scale for weighing is always greater than the weight of any car to be weighed. In the position normally occupied by the poise in my device the beam will be prevented from vibrating until the moving weight upon the platform shall have closed the circuit $y$, and thereby have released the end of the finger M from the wheel K, to permit the drum D, revolved by the gravity of the weight $s$, to wind the rope $u$ around its periphery and draw the poise backward until it shall reach the point upon the scale-beam at which the weight upon the platform will be balanced, when the end N of the scale-beam will rise, (and not before,) close the circuit $z$ of the recording device O, causing the marker P to puncture or mark its position upon the scale-beam upon the strip of paper provided with numbers corresponding with and directly underneath those upon the scale-beam, and thus automatically record the weight. When this operation has been performed, the further drawing backward of the poise is prevented by the rise of the notched finger $M^2$, and consequent release of the finger M, effected by the electro-magnet device Q, as hereinbefore described.

What I claim as new, and desire to secure by Letters Patent, is—

1. In a platform-scale, the combination, with the movable poise and platform, of mechanism operated by the weight of a body moving across the platform to cause the poise to register the weight of such moving body automatically upon the scale-beam, substantially as described.

2. In a platform-scale, the combination, with mechanism actuating the poise to move and register automatically upon the scale-beam the weight of a body moving across the platform, of mechanism operating automatically, at the instant the poise reaches the point of equilibrium upon the scale-beam, to record the weight of the body moving across the platform, substantially as described.

3. In a platform-scale, the combination, with mechanism actuating the poise to move and register automatically upon the scale-beam the weight of a body moving across the platform, and with mechanism operating automatically, at the instant the poise reaches the point of equilibrium upon the scale-beam, to record the weight of the said body moving across the platform, of mechanism operating automatically to stop the motion of the poise at or beyond the point at which the weight of the said moving body is registered, substantially as described.

4. In a platform-scale, the combination, with the platform and poise, and with an electric generator, of mechanism operated by weight of a body moving across the platform to close and open an electric circuit, and mechanism actuated by the electric current to move the poise upon the scale-beam backward from its vibratory end until it shall register automatically thereon the weight of the said body moving across the platform, substantially as described.

5. In a platform-scale, the combination, with the platform and poise, and with an electric generator having two circuits, of mechanism operated by weight of a body moving across the platform to close and open one electric circuit, mechanism actuated automatically by the electric current traversing the said circuit to move the poise upon the scale-beam backward from its vibratory end until it shall register thereon the weight of the said body moving across the platform, mechanism actuated automatically by the electric current traversing the said circuit to close and open the second electric circuit, and mechanism operating, the instant the poise shall register upon the scale-beam the weight of the moving body, to record the same, substantially as described.

6. In a platform-scale, the combination, with the platform and poise, and with an electric generator having two circuits, of mechanism operated by the weight of a body moving across the platform to close and open one electric circuit, mechanism actuated automatically by the electric current traversing the said circuit to move the poise upon the scale-beam backward from its vibratory end until it shall register thereon the weight of the said body moving across the platform, mechanism to close and open the second electric circuit, mechanism actuated automatically by the electric current traversing the second circuit, at the instant the poise registers upon the scale-beam the weight of the said moving body, to record the same, and mechanism actuated by the last-named electric current to stop the motion of the poise at or beyond the point at which the weight of the said moving body is registered, substantially as described.

7. In a platform-scale, the combination, with the poise C', and with an electric generator having two circuits, of mechanism operated by the electric current to move the poise upon the scale-beam C, pawl or finger M, engaging with a ratchet-wheel, K, finger or hook M², having a notch, b, toward one end to sustain the finger M when disengaged from the wheel K, and mechanism actuated by an electric current to free the finger M when so engaged, to permit the same to re-engage, at the proper moment, with the wheel K, all being constructed and arranged to operate substantially as described.

8. In a platform-scale, the combination, with the poise C' and an electric generator having two circuits, of mechanism actuated by an electric current to record a weight moving across the platform, said mechanism comprising a frame, O, suspended from a guide, $h^2$, upon a beam, $h^3$, suitably supported by a rod, $h'$, passing between and directed by guide-pins $g$ upon the poise-guide $C^2$, electro-magnet L', marker P, and adjustable armature $n'$, to actuate the marker P, the whole being constructed and arranged to operate substantially as described, and for the purpose set forth.

9. The combination, with the scale-beam C of a platform-scale, an electric generator having two circuits, and mechanism actuated by the current traversing one of the said circuits to actuate the poise C', of mechanism for momentarily closing and opening the other electric circuit, said mechanism comprising the part $i$, of non-conducting material, plate $i'$, of conducting material, frame $l$, suitably supported, wheels $k$, sustained by the said frame, and rods $j$ upon the said wheels, the plate, frame, wheels, and rods being formed of conducting material, and the whole being constructed and arranged to operate substantially as described.

EDWIN R. PUFFER.

In presence of—
C. C. LINTHICUM,
DOUGLAS DYRENFORTH.